US009795089B2

(12) United States Patent
Kantola et al.

(10) Patent No.: US 9,795,089 B2
(45) Date of Patent: Oct. 24, 2017

(54) SYSTEM, A METHOD, AND A TROUGH FOR THE CULTIVATION OF PLANTS

(75) Inventors: Juhana Kantola, Espoo (FI); Tero Rapila, Otalampi (FI); Timo Rapila, Turku (FI)

(73) Assignee: GREEN AUTOMATION EXPORT OY, Helsinki (FI)

( * ) Notice: Subject to any disclaimer, the term of this patent is extended or adjusted under 35 U.S.C. 154(b) by 0 days.

(21) Appl. No.: 14/127,024

(22) PCT Filed: Jun. 15, 2012

(86) PCT No.: PCT/FI2012/050621
§ 371 (c)(1),
(2), (4) Date: Dec. 17, 2013

(87) PCT Pub. No.: WO2012/172187
PCT Pub. Date: Dec. 20, 2012

(65) Prior Publication Data
US 2014/0115960 A1    May 1, 2014

(30) Foreign Application Priority Data
Jun. 17, 2011   (FI) ...................................... 20115617

(51) Int. Cl.
*A01G 9/02*        (2006.01)
*A01G 31/00*       (2006.01)
(Continued)

(52) U.S. Cl.
CPC ............... *A01G 9/02* (2013.01); *A01G 9/047* (2013.01); *A01G 31/00* (2013.01); *A01G 31/02* (2013.01); *A01G 31/042* (2013.01); *Y02P 60/216* (2015.11)

(58) Field of Classification Search
CPC .......... A01G 9/02; A01G 9/104; A01G 9/108; A01G 31/04; A01G 31/042
(Continued)

(56) References Cited

U.S. PATENT DOCUMENTS 3,467,609 A * 9/1969 Adams et al. ..................... 47/64
3,771,258 A * 11/1973 Charney ........................... 47/65
(Continued)

FOREIGN PATENT DOCUMENTS

DE   8901847 UI   6/1990
FI       54215 B    7/1978
(Continued)

OTHER PUBLICATIONS

Translation of Oct. 20, 2014 Office Action issued in Chinese Patent Application No. 201280029738.X.
(Continued)

*Primary Examiner* — Monica Williams
(74) *Attorney, Agent, or Firm* — Oliff PLC

(57) ABSTRACT

A system for the cultivation of plants, including: a cultivation table, in which the plants to be cultivated have been placed at least for the time of the growing stage; growing substrates in which the seeds of the plant are sown and which are placed at the initial end of the cultivation table for germination; and elongated troughs which hold the growing substrates in which troughs also the seeds and seedlings of the plant as well as the grown plants are placed during both said germination and said growing stage. In the method for cultivation of plants in a greenhouse, a growing substrate for the cultivation of plants is placed in an elongated trough, and seeds of a plant are sown in said growing substrate placed in the trough.

18 Claims, 4 Drawing Sheets

(51) Int. Cl.
*A01G 31/02* (2006.01)
*A01G 31/04* (2006.01)
*A01G 9/04* (2006.01)

(58) Field of Classification Search
USPC .................................. 47/62 R, 62 C, 65
See application file for complete search history.

(56) References Cited

U.S. PATENT DOCUMENTS

| | | | | |
|---|---|---|---|---|
| 4,028,847 A | * | 6/1977 | Davis | ............ A01G 31/042 165/59 |
| 4,166,341 A | * | 9/1979 | Vestergaard | ............ 47/59 R |
| 4,216,618 A | * | 8/1980 | Haub | ............ A01G 31/045 47/39 |
| 4,476,651 A | * | 10/1984 | Drury | ............ 47/65 |
| 4,617,755 A | * | 10/1986 | Ikeda | ............ A01G 31/045 47/65 |
| 4,916,856 A | | 4/1990 | Bourgogne | |
| 4,932,158 A | * | 6/1990 | Roberts | ............ A01G 31/047 47/64 |
| 5,323,567 A | * | 6/1994 | Nakayama | ............ A01G 31/042 47/63 |
| 5,473,874 A | * | 12/1995 | Nilsen | ............ 56/327.1 |

FOREIGN PATENT DOCUMENTS

| | | |
|---|---|---|
| FI | 84968 B | 11/1991 |
| GB | 1 523 624 A | 9/1978 |
| GB | 2 026 831 A | 2/1980 |
| GB | 2 077 082 A | 12/1981 |
| JP | S50-068826 A | 6/1975 |
| JP | H01-256325 A | 10/1989 |
| JP | H05103544 A | 4/1993 |
| JP | H09154423 A | 6/1997 |
| JP | 2002-272279 A | 9/2002 |
| JP | 2007-252315 A | 10/2007 |
| RU | 2286050 C2 | 10/2006 |

OTHER PUBLICATIONS

Mar. 20, 2012 Search Report issued in Finnish Patent Application No. 20115617 (with translation).
Nov. 2, 2012 Search Report issued in International Patent Application No. PCT/FI2012/050621.
Nov. 2, 2012 Written Opinion issued in International Patent Application No. PCT/FI2012/050621.
Sep. 19, 2013 IPRP issued in International Patent Application No. PCT/FI2012/050621.
Sep. 30, 2016 Office Action issued in Russian Patent Application No. 2014101303.
Apr. 6, 2016 Office Action issued in Japanese Patent Application No. 2014-515242.
Mar. 1, 2017 Office Action Issued in Japanese Patent Application No. 2014-515242.

\* cited by examiner

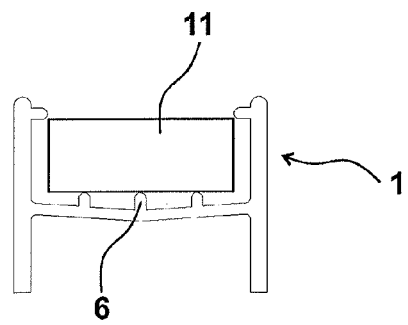
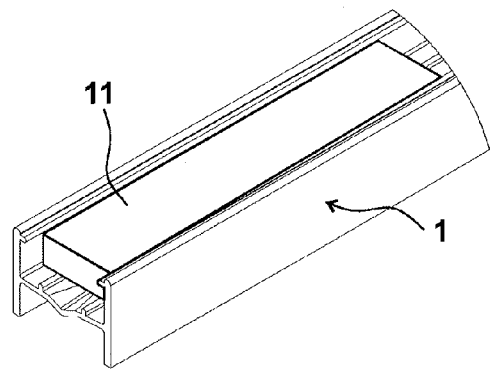
Fig. 3    Fig. 4
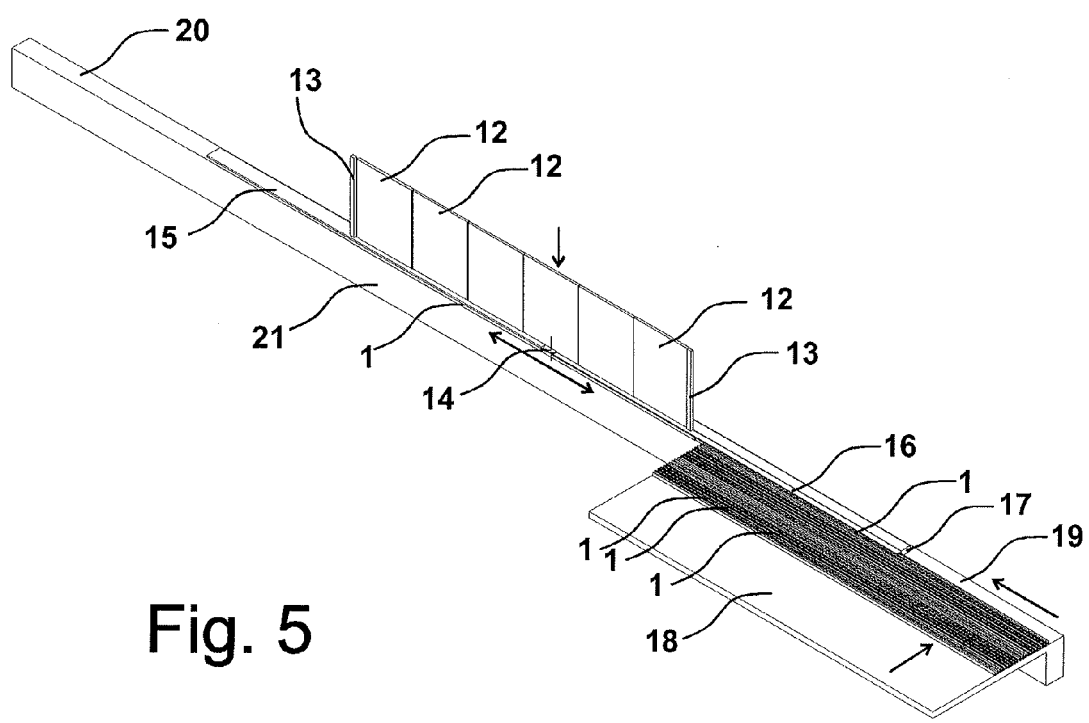
Fig. 5

SYSTEM, A METHOD, AND A TROUGH FOR THE CULTIVATION OF PLANTS

FIELD OF THE INVENTION

The invention relates to a system for the cultivation of plants. The invention also relates to a method for the cultivation of plants. The invention further relates to an elongated trough for the cultivation of plants in a greenhouse.

BACKGROUND OF THE INVENTION

In prior art, the cultivation of leaf vegetables in greenhouses is based on the use of, for example, elongated pipes, the side surface of the pipe being equipped with openings, in which seedlings are placed. The seedlings of plants are placed in the openings in the pipe, each seedling with a root ball consisting of e.g. soil. Normally, the root ball is also enclosed in a supporting structure, which is e.g. a mesh-like pot. Said pot is made of, for example, plastic, but also compressed peat or the like can be applied. The seed of the plant is sowed in said pot which has first been filled with e.g. peat. The peat is used as the growing substrate for the seed and the seedling. The pots are placed in cells which are brought for germination into e.g. a chamber at a suitable temperature and under conditions favourable for germination. The cells are, for example, boxes equipped with cavities for the pots. After the germination, the cells are placed on a seedling table, where the seedlings are irrigated from above. After this, the pots with the germinated seedlings are removed from the cells and placed in openings in the pipes.

A seedling that has grown to a sufficient size, with its root ball and the pot, is placed in the pipe, whose openings have room for several seedlings in succession. The pipe is placed on a cultivation table in a greenhouse, where the seedling of the plant is allowed to grow until the plant is ready for harvesting. Normally, automatic cultivation tables are used, which automatically take care of the irrigation of the plants and transfer the pipe forward, wherein the direction of movement is transverse to the longitudinal direction of the pipe. Furthermore, the seedling tables change the distance between the pipes so that when the plant grows in size, the distance between the pipes is also increased automatically. Normally, at the initial end of the cultivation table, the seedlings are placed in the pipes, and the pipes are also as close to each other as possible; and at the terminal end of the cultivation table, the plants are collected from the openings of the pipes, together with the root ball and the pot, and the pipes are spaced from each other. The empty pipes are brought to the initial end of the table for filling again, possibly preceded by washing of the pipes.

The pipe used for growing is, for example, a tubular structure whose top surface has been drilled or punched to provide openings, in which the seedlings, together with the root ball and normally also with a pot, can be inserted firmly. The roots of the seedling, which are in the root ball, are placed inside the pipe, to which irrigation water is led. The roots of the seedlings take in the water they need, and excess water can be drained along the pipe. In an example, irrigation water with nutrients is led into the pipe via its first end, and excess irrigation water is drained from the pipe via its opposite second end. The pipe is made of, for example, plastic, by applying, for example, extrusion as the manufacturing method.

Publication DE 8901847 U1 presents an example of a pipe used for cultivation, where the bottom part and the top of the pipe are made of two different pieces which are joined together. The cover is provided with punched holes, in which the seedling and its root ball as well as the pot enclosing the root ball can be inserted.

The cross-section of the bottom part of the pipe can be, for example, a U shape or an H shape, with either vertical or slightly slanted side walls. The shape of the bottom of the bottom part is, for example, horizontal or a V shape.

The use of the pot, the filling of the pot with peat, the sowing of a seed in the peat, moving the pot to the germination process and from it to e.g. a seedling table (utilizing e.g. cells which hold several pots in the process), and further moving the seedling with its pot into the openings of the pipe and onto the cultivation table, and finally, for the harvesting, also removing the finished plant with its pot from the pipe, are steps of cultivation of plants, for example, in greenhouses, in the case of cultivation of leaf vegetables and particularly lettuce. It is difficult to automate the above presented steps, or to reduce them in number, for efficient cultivation.

BRIEF SUMMARY OF THE INVENTION

The system according to the invention for cultivation of plants is presented in claim 1. The method according to the invention for cultivation of plants is presented in claim 13. The elongated trough according to the invention, for the cultivation of plants in a greenhouse, is presented in claim 18.

Now, furthermore, a solution is presented, by which the cultivation of e.g. leaf vegetables in greenhouses can be made significantly simpler and more efficient. In addition, the present solution makes it possible to automate several steps of the cultivation.

A particular feature in the solution is to apply, in the cultivation, an open trough, in which the growing substrate needed by the plant is placed. Preferably, the substrate is placed in the trough automatically. The plant is in the trough both as a seed and as a seedling, and as a plant ready for harvesting, so that it is possible to reduce manual work stages and to automate the manipulation of troughs.

In an embodiment of the solution, a seed is sowed in a trough which is provided with a growing substrate needed by the seed. Said trough is also used during germination, and the seedling is allowed to grow in it until it is ready for harvesting. Preferably, the trough is open at the top, either entirely or almost entirely, so that the planting distance between two seeds can be selected freely. Because the trough is open at the top, the growing substrate can be easily installed in it, particularly also with an automated apparatus.

In an advantageous embodiment of the solution, the substrate is an elongated or band-like element. Preferably, an apparatus is available, by means of which the element is first formed and then inserted, lowered or dropped into the trough, through the open side of the trough.

In an embodiment of the solution, the band-like growing substrate is cut out of one or more sheet elements, for example by sawing. The material of the growing substrate is, for example, insulation material used for building construction, supplied in sheet elements and consisting of mineral wool. The growing substrate can also consist of soil or peat.

DESCRIPTION OF THE DRAWINGS

FIG. 3 shows a cross-section of a trough, seen at the end of the trough and holding an elongated substrate;

FIG. 4 shows one end of an elongated trough, holding an elongated growing substrate;

FIG. 5 shows a reduced view of an apparatus configured to form growing substrates and to place them in a trough;

DETAILED DESCRIPTION OF THE INVENTION

Figure 1:
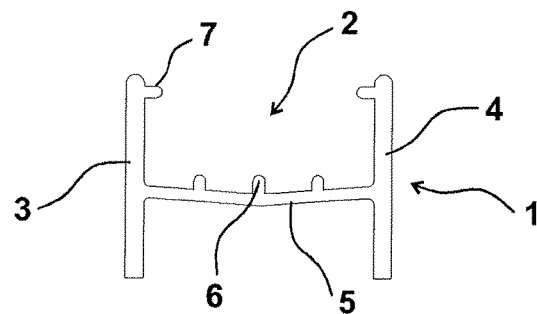
FIG. 1 shows a cross-section of a trough, seen at the end of the trough.

FIG. 1 shows a trough 1 according to the present solution, comprising a left side wall 3 and a right side wall 4, which are parallel and in this example also vertical in their use position. The side walls are spaced from each other, and they are joined by a bottom 5 which is horizontal. The bottom 5 is connected at a distance from the lowermost ends of the side walls, making up an H shape. A chamber 2 is left between the side walls and above the bottom, in which space the growing substrate needed by the plant and the seed are placed. The side walls 3 and 4 can also be slightly oblique and tilted towards each other. The bottom can also be oblique or it has a V shape.

The trough 1 does not have a cover, but pieces can be placed between the uppermost ends of the side walls, such as supports, bridges or braces, to support the side walls, the substrate placed in the chamber, or the growing plant. Said pieces can be, for example, rigid plates, sticks or bands. In an example, said pieces constitute covers which are placed between the plants. In this example, the side walls are provided with collars 7 extending in the direction of the chamber 2, facing each other. The collar 7 is placed at the upper end of the side wall. A locking piece can be placed between two opposite collars 7 to hold the growing substrate in the chamber 2. The locking piece is, for example, a rigid plate, stick or band placed on the growing substrate.

Preferably, one or more supports 6 are provided on the bottom of the chamber 2, fixed to the bottom 5, lifting the support off the bottom 5 and forming one or more air passages between the bottom 5 and the growing substrate, through which passages irrigation water can also flow.

Figure 2:
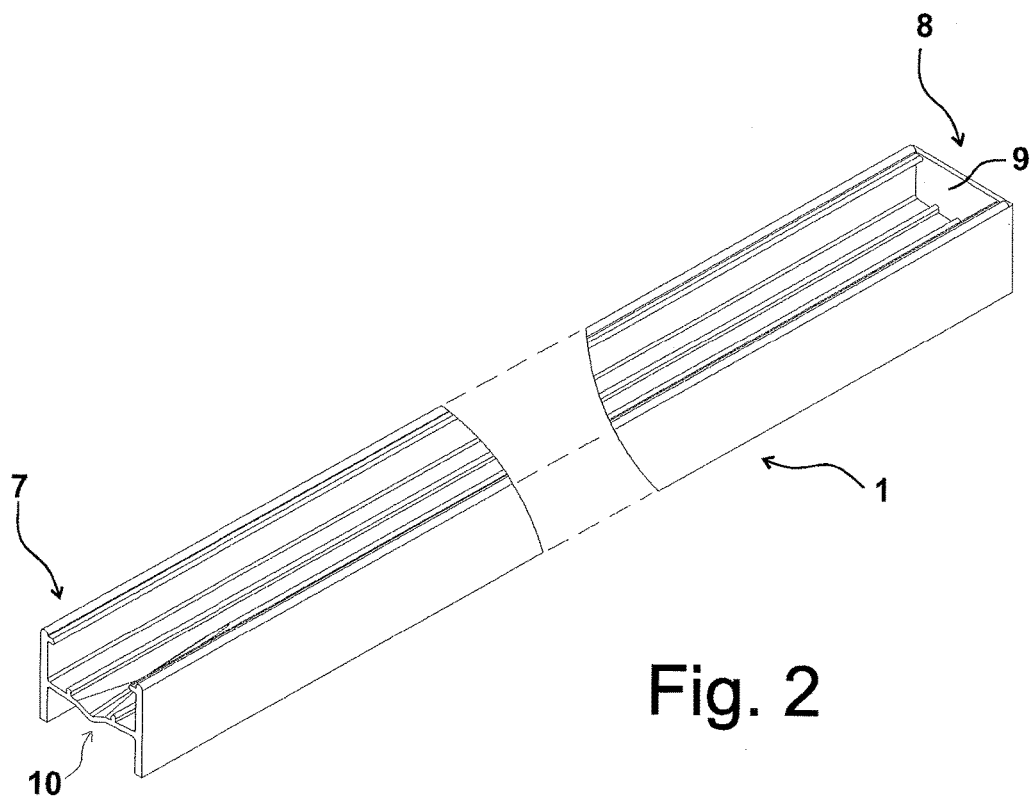
FIG. 2 shows an elongated trough and its structure.

The trough 1 is preferably made of plastic by extrusion, wherein the cross-sectional shape of the trough 1 of FIG. 1 extends continuously over the whole length of the elongated trough 1, as shown in FIG. 2. In another example, the trough 1 is made of aluminium by extrusion. The length of the trough 1 is multiple compared with the width of its chamber 2 or the height of the side wall. In the example of FIG. 2, the first end 8 of the trough is closed with a vertical cover 9. At the end 8 of the trough, irrigation water can be supplied, flowing through the whole trough 1 and the chamber 2 and exiting from the second end 7 of the trough. The second end 7 can be provided with, for example, a recess 10 to facilitate the draining of irrigation water from the trough.

In FIG. 3, the growing substrate 11 is placed on top of supports 6 in the chamber 2. The growing substrate 11 is placed or lowered in the chamber 2 via the open top of the trough 1. In this example, the width of the growing substrate 11 is configured such that the substrate can be dropped in place between the side walls from above the trough 1, and if necessary, it fits between the collars 7. The height of the growing substrate 11 is configured, for example, such that the substrate is placed under the uppermost ends or collars 7 of the side walls.

In an example and FIG. 4, the growing substrate 11 is an elongated or band-like element made of a solid porous material and constituting a flexible structure which is resistant to e.g. bending, at least to some extent, without breaking. The growing substrate 11 can also consist of a rollable material which is band-like and supplied in rolls. Of the band-like growing substrate, a suitable length is cut out and placed in the trough 1, or several portions which are shorter than the total length of the trough 1 are placed in the trough 1. It is also possible to place, for example, two band-like growing substrates on top of each other in the trough 1. The trough 1 is primarily or totally open on one side (see the open top side in FIG. 1) so that a growing substrate 11 or several growing substrates 11 can be placed in the trough from a direction that is transverse to the longitudinal direction of the trough (that is, from above in FIG. 1).

In an example, the band-like element of the growing substrate 11 is removed from a sheet element, that is, a sheet 12 shown in FIG. 5, for example by sawing or cutting. Several band-like elements for the growing substrate 11 are obtained from the sheet 12. Preferably, the thickness of the sheet 12 corresponds to the width of the growing substrate 11 of FIG. 3, and the width or length of the sheet 12 corresponds to the length of the growing substrate 11 shown in FIG. 4. The height or thickness of the growing substrate 11 shown in FIG. 3 is determined on the basis of cutting of the sheet 12. The sheets 12 are preferably rectangular sheets.

The material of the sheet 12 and thereby also the substrate 11 is preferably mineral wool, for example rock wool or glass wool, which is also used as thermal insulation in a known manner. The material can also be soil or peat.

FIG. 5 shows an example of an apparatus, by means of which the cutting of the growing substrate 11 out of the sheet 12, and the placement of the growing substrate 11 in the trough 1 are automated. By means of the apparatus, the feeding of empty troughs 1 in the apparatus and the discharging of finished troughs 1 from the apparatus are also automated.

The automatic apparatus comprises a magazine 13 in which one or more sheets 12 are stored, of which sheets the growing substrates 11 are cut out.

In this example, the sheets 12 are vertical, and growing substrates are cut out of their lower edge 12a. The apparatus is placed in such a way that the growing substrates 11 are either dropped by gravity or in an assisted manner into the open trough 1. The moving blade 14 of the cutting device cuts growing substrates 11 of desired thickness out of the sheet 12, to be guided into the trough 1.

In the presented apparatus, the weight of the sheets 12 tends to move them downwards and against moving horizontal stop surfaces 15 and 16. The distance between the stop surfaces substantially corresponds to the thickness of the growing substrate 11. The stop surfaces 15 and 16 as well as the blade 14 are placed one after the other, and the blade 14 is placed between the stop surfaces. The troughs 11 can also be fed or placed into the apparatus manually, but it is preferable that the apparatus also comprises automated members for feeding the trough into the apparatus or discharging the trough from the apparatus.

According to the example of FIG. 5, and the same principles can also be applied in other examples presented above, the apparatus comprises a frame structure or a frame 21, in which the different members and actuators are placed.

The frame 21 is equipped with the necessary guides, actuators, motors, and electronic control units for effecting the movements of the apparatus and the synchronization or phasing of the functions. In an example, the movement of the blade 14 is implemented manually, but preferably their movement is implemented by controlled actuators. In the presented example, a trough magazine 18 is provided at the first end 19 of the frame, holding several empty troughs 1 which are aligned next to each other.

Figure 6:
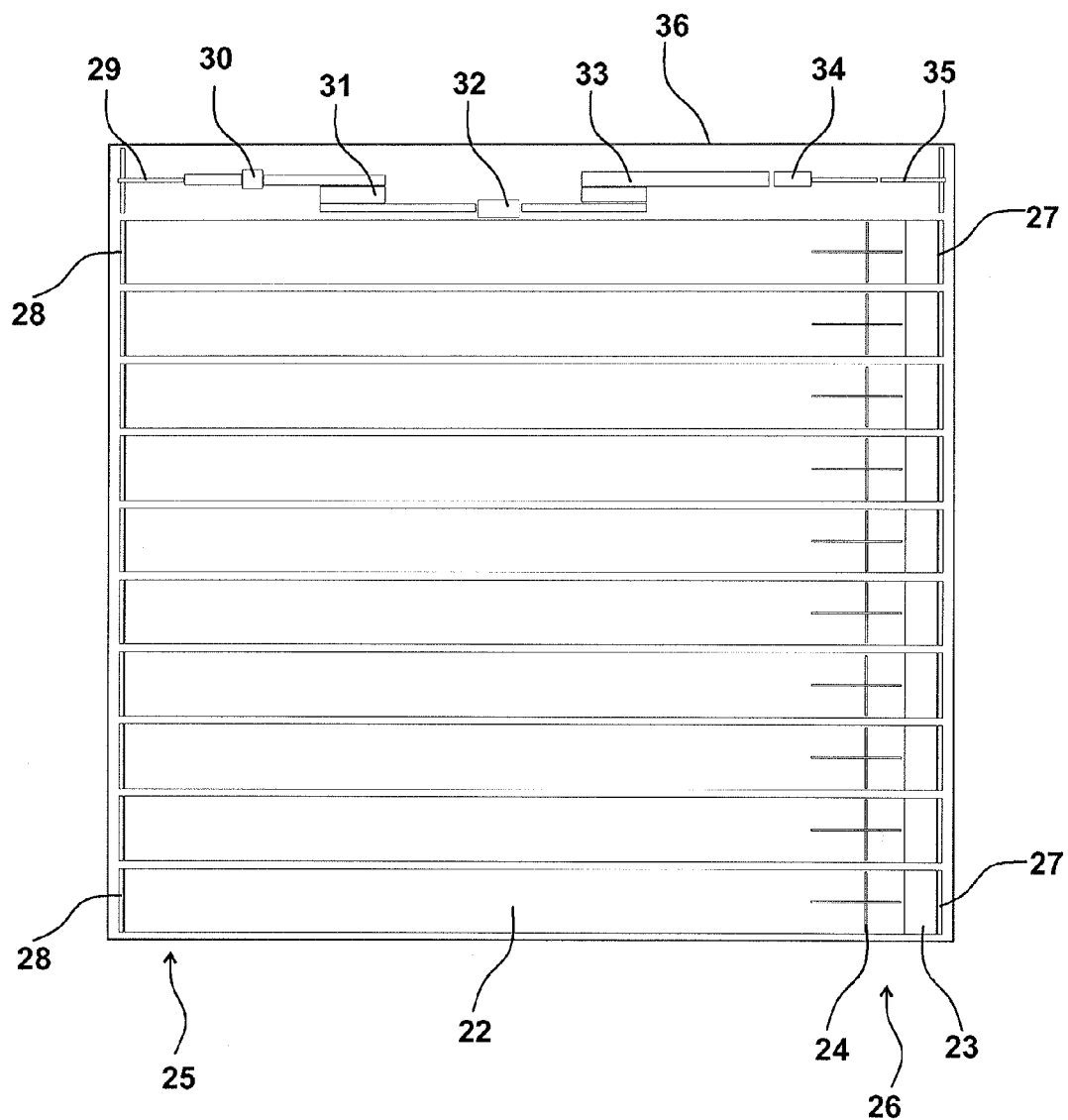
FIG. 6 shows, seen from above, a reduced chart on a system which can be applied in a greenhouse.

FIG. 6 shows a system implementing the troughs 1 for the cultivation of plants; in this case, particularly leaf vegetables should be mentioned. The system is placed in a greenhouse 36 which is provided with suitable conditions for growing plants, particularly in view of light, temperature, moisture, air, irrigation, and nutrients taken in by the plants. The system can be placed in greenhouse buildings known as such, and partly also in their immediate vicinity.

Preferably, the system also applies cultivation tables known as such. Preferably, they are cultivation tables which automatically take care of the irrigation of the plants and transfer the plants forward, and also change the distance between the plants in such a way that when the plants grow in size, their spacing is automatically increased as well. Cultivation tables of prior art move pipes whose top surface is provided with a cut or punched opening for the root ball and the pot of the plant. The troughs according to the new solution, open at the top, are configured to have such a structure that they are suitable for being used on said cultivation tables.

The troughs according to the novel solution bring advantages to prior solutions. The structure of the trough, open at the top, makes it possible that the spacing of the seeds can be selected more freely, depending on the plant. For cultivation, pipes of prior art were provided with openings which determined the spacing of seedlings. Previously, pipes were not used for sowing seeds either, but only germinated seedlings were transferred into the openings in the pipe, with the root ball and the pot. Thanks to the open structure, the trough can be made narrower than said pipes, so that particularly at the initial end of the cultivation table, the troughs can be placed more densely and effectively. With the trough according to the new solution, the number of handling steps is considerably reduced, because the same trough is also used for sowing of seeds, in the germination step, and for cultivation of the seedling. The trough according to the new solution is also suitable for automatic processing.

The system according to the presented example comprises one or more cultivation tables 22, onto which the troughs 1 are placed. On the cultivation table 22, the troughs 1 are aligned next to each other, and they are placed across (preferably perpendicularly to) their transfer direction. Preferably, the cultivation tables 22 automatically take care of transferring the troughs 1 from the initial end 26 of the table to the terminal end 25 of the table, but the cultivation table can also be one in which the transfers are performed manually and which forms a support or structure for supporting the troughs. The cultivation table 22 can comprise the necessary pipe systems and devices for supplying irrigation water to the troughs and, if necessary, also means for receiving excess water from the troughs. At the initial end 26 of the table, the troughs are adjacent to each other, and at the terminal end 25 of the table, the troughs are spaced from each other because the plants need more space than at the initial end 26.

Troughs in which the seeds have already been sown are placed at the initial end 26 of the table. A germination chamber 23, which is placed above the cultivation table 22 and the troughs, is also placed at the initial end and is connected to the structure of the cultivation table as needed. The germination chamber 23 extends over several troughs and covers them. The germination chamber 23 can comprise the necessary means and devices for providing the germination chamber with conditions favourable for the germination of the seed, particularly in view of moisture and temperature. The germination chamber 23 can also be a stationary or temporary shield or cover, for example a plastic covering placed on the troughs. Preferably, the dimensions of the germination chamber can be changed.

By means of the troughs, the germinated seeds are gradually transferred out of the germination chamber, and the seedlings continue to grow as long as they are moved towards the terminal end 25 of the table. Preferably, after the germination chamber 23, the seedlings are also irrigated from above, for example by means of spraying, atomizing or sprinkling. The means and devices 24 needed for irrigating the seedlings are placed above the cultivation table 22, at least at the initial end 26 of the table. Preferably, the devices 24 can be controlled in such a way that the dimensions of the area to be irrigated can be changed.

Figure 7:
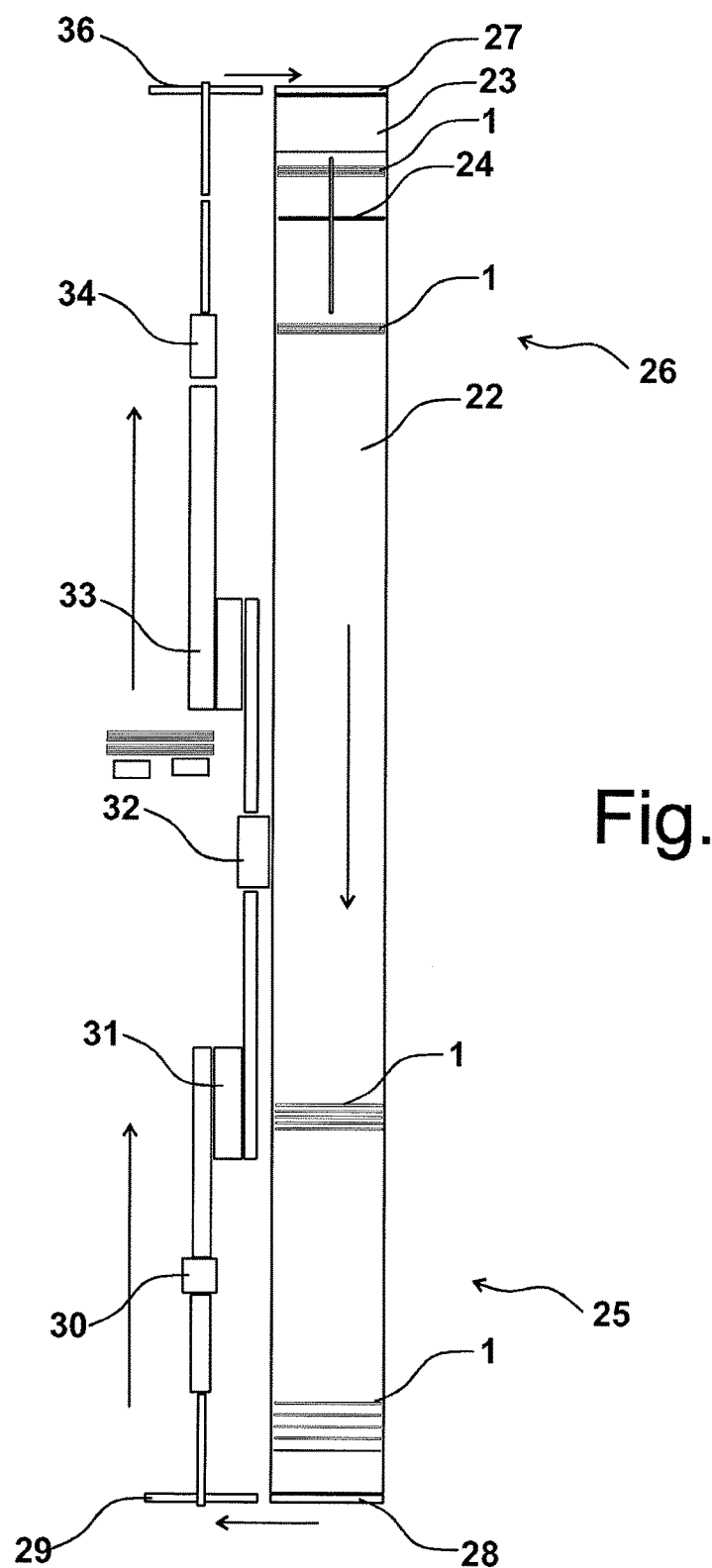
FIG. 7 shows a detail of the system of FIG. 6, particularly a cultivation table and devices for manipulating troughs.

In the example of FIGS. 6 and 7, the system also comprises transfer means 28, by means of which the trough 1 can be removed from the cultivation table 22 and transferred to a desired position or location. Preferably, a belt conveyor is provided, which also has a lifting movement for lifting the trough off the cultivation table 22. In another alternative, a lifting device is provided at the end of the cultivation table for transferring the trough to the transfer device 28. In a third alternative, the cultivation table 22 is provided with a lifting or lowering movement for transferring the trough to the transfer device 28. The transfer devices 28 can be part of the structure of the terminal end 25 of the table.

The system also comprises transfer means 27, by means of which the trough 1 can be brought to the cultivation table and laid onto the cultivation table 22. Preferably, a belt conveyor is provided, which also has a lowering movement for lowering the trough onto the cultivation table 22. In another alternative, a lifting device is provided at the end of the cultivation table for moving the trough from the transfer device 27 onto the cultivation table 22. In a third alternative, the cultivation table 22 is provided with a lifting or lowering movement for transferring the trough from the transfer device 27 onto the cultivation table. The transfer devices 27 can be part of the structure of the initial end 26 of the table.

Preferably, the transfer devices 27 of two or more adjacent cultivation tables 22 are arranged one after the other, and the trough is conveyed substantially transversely to the longitudinal direction of the cultivation table. The trough is conveyed to the desired cultivation table 22 via the transfer devices 27 of one or more other cultivation tables 22.

Preferably, the transfer devices 28 of two or more adjacent cultivation tables 22 are also arranged one after the other, and the trough is conveyed substantially transversely to the longitudinal direction of the cultivation table. The trough is carried away from the cultivation table 22 in such a way that is carried via the transfer devices 28 of one or more other cultivation tables 22 to the desired position or location. The transfer devices 27, 28 are preferably elongated conveyors, for example belt conveyors.

The system also comprises a position 30 in which the grown-up plants are collected from the troughs and are, if necessary, also packed, preferably without the roots. The plants are cut off the growing substrate, in which the roots of the plants remain. The operation is typically manual, but at least partial automation for cutting off and collecting the plants is possible by means of various devices.

In a station 31, the old growing substrate is removed from the troughs and collected for further processing. The emptying is preferably done by machine, for example by turning the trough upside down. The detachment of the growing substrate can be facilitated by shaking, brushing, water jets, air blows or suction, or by scraping, and a combination of these methods is applied by the apparatus. The operation of the station 31 can also be manual and based on the use of various tools.

In a separate station 32, the washing and cleaning of the troughs are performed, or the washing functions are combined in the station 31. The washing and cleaning can be intensified by brushing, water jets, air blowing or suction, and any combination of these methods can be applied by the apparatus. The operation of the station 32 can also be manual and based on the use of various tools.

In a station 33, a new growing substrate is placed in the trough. In the station 33, it is possible to apply, for example, the apparatus of FIG. 5, whose operation is controlled manually, or at least some of the functions are automated. The operation of the station 33 can also be manual and based on the use of various tools. The material of the growing substrate is in the form of either a sheet element or a roll. Preferably, the growing substrate is cut either manually or by machine out of the sheet element, which provides several growing substrates. If necessary, ready-to-use growing substrates are obtained from a supplier.

In a station 34, the seeds are sown directly into the growing substrate in the trough. The operation of the station 34 can also be manual and based on the use of various tools or sowing devices. Preferably, the sowing device is automatic and it applies, for example, underpressure and/or pressurized air for guiding the seed into the substrate.

Between the stations and in desired locations at the initial end and the terminal end of the cultivation table, a required number of transfer devices is provided, for example conveyors for transferring the trough to and from the station. FIG. 7 shows, for example, swinging conveyors 29 and 36 which turn the trough into a desired position and feed it forward. The space required by the system is made as small as possible when the trough is carried in the longitudinal direction, for example from the terminal end 25 of the table to the initial end 26 of the table. Also at the stations, the position of the trough remains unchanged, being parallel to the longitudinal direction of the cultivation table. If necessary, for example between stations, the trough is transferred in the lateral direction, but preferably its orientation is not changed. Between the stations, buffer storages may be provided for storing several troughs adjacent to each other. If the directions of the cultivation tables vary or there is a need to turn the trough 180°, the direction of the troughs is controlled by the gravity bucket conveyors.

In the system, it is possible to implement either all or a part of the above-presented functions. The circulation of the troughs in the system is preferably continuous. The stations and devices may be operated manually or automatically, but preferably the operation is either totally or almost totally automatic, and for example only the cutting of the plants off the growing substrate is manual.

In the implementation of the system, it is possible to apply electronic, pneumatic or hydraulic actuators and, if necessary, also programmable control devices which investigate, for example by means of sensors or switches, the status of the devices and control the actuators in a predetermined way. These devices will not be explained in more detail, because their selection, assembly and placement are obvious as such.

The above presented description provides sufficient instructions for implementing the different functions of the devices so that a person skilled in the art can implement them and make the more specific selections for, for example, the actuators and the control or control devices needed by them.

The invention is not limited solely to the above-presented examples, alternatives or embodiments, but it can also be applied within the scope of the technical features of the appended claims.

The invention claimed is:

1. A system for cultivation of plants, comprising: a cultivation table for cultivating plants,
   a first plurality of elongated troughs having growing substrates provided with seedlings of the plant and placed in the elongated troughs, wherein the first plurality of elongated troughs are placed on the cultivation table between an initial end of the cultivation table and a terminal end of the cultivation table for providing a growing stage,
   a second plurality of elongated troughs having growing substrates provided with grown plants and placed in the elongated troughs, wherein the second plurality of elongated troughs are placed on the terminal end of the cultivation table,
   a third plurality of elongated troughs having growing substrates provided with sown seeds of the plant and placed in the elongated troughs, wherein the third plurality of elongated troughs are placed on the initial end of the cultivation table for providing a germination stage and germinating the sown seeds of the plant to seedlings of the plant, and
   a germination chamber placed at the initial end of the cultivation table, wherein the germination chamber is configured in the germination stage to provide conditions favorable for the germinating, wherein the germination chamber is connected to the structure of the cultivation table, extends over and covers the third plurality of elongated troughs,
   wherein the cultivation table is equipped with devices for supplying irrigation water to elongated troughs,
   wherein each growing substrate of the third plurality of elongated troughs is an elongated band-like element having the seeds of the plant sown with a selected spacing between the seeds,
   wherein longitudinal directions of the first, second and third plurality of elongated troughs are placed parallelly next to each other on the cultivation table and the cultivation table is configured to automatically transfer the first, second and third plurality of elongated troughs to a direction transverse to the longitudinal directions towards the terminal end of the cultivation table.

2. The system according to claim 1, wherein the first, second and third plurality of elongated troughs are open at the top and provide a freely selectable spacing for the seeds of the plant.

3. The system according to claim 1, wherein the system further comprises devices for irrigating the seedlings of the plant, wherein the devices are placed at least at the initial end of the cultivation table and configured to irrigate the seedlings of the plant from above.

4. The system according to claim 1, wherein the system further comprises automated devices configured to sow the seeds of the plant into the growing substrates placed in the third plurality of elongated troughs.

5. The system according to claim 1, wherein the system further comprises automated devices configured to place the growing substrates into the first, second and third plurality of elongated troughs.

6. The system according to claim 1, wherein the system further comprises an automated cutting device configured to cut the growing substrates of the first, second and third plurality of elongated troughs out of sheet elements and to place the growing substrates into the first, second and third plurality of elongated troughs.

7. The system according to claim 1, wherein the cultivation table further comprises a conveyor placed at the initial end of the cultivation table and configured to bring elongated troughs of the third plurality of elongated troughs having the growing substrates provided with the sown seeds of the plant to the cultivation table.

8. The system according to claim 7, wherein the system further comprises a second conveyer of a second cultivation table, wherein the second conveyor and the conveyor placed at the initial end of the cultivation table are arranged one after the other and configured to convey the elongated troughs of the third plurality of elongated troughs substantially transversely in relation to a longitudinal direction of the cultivation table, and wherein the second conveyor and the conveyor placed at the initial end of the cultivation table are configured to convey the elongated troughs of the third plurality of elongated troughs to the cultivation table via the second conveyor.

9. The system according to claim 1, wherein the cultivation table further comprises a conveyor placed at the terminal end of the cultivation table and configured to convey elongated troughs of the second plurality of elongated troughs having the growing substrates provided with the grown plants away from the cultivation table.

10. The system according to claim 9, wherein the system further comprises a second conveyer of a second cultivation table, wherein the second conveyor and the conveyor placed at the terminal end of the cultivation table are arranged one after the other and configured to convey the elongated troughs of the second plurality of elongated troughs substantially transversely in relation to a longitudinal direction of the cultivation table, and wherein the second conveyor and the conveyor placed at the terminal end of the cultivation table are configured to convey the elongated troughs of the second plurality of elongated troughs away from the cultivation table via the second conveyor to another location.

11. The system according to claim 1, wherein the system further comprises devices for washing the first, second and third plurality of elongated troughs, and devices for removing the growing substrates from the first, second and third plurality of elongated troughs.

12. The system according to claim 1, wherein the system further comprises conveyor devices configured to convey the first, second and third plurality of elongated troughs from one station to another.

13. The system according to claim 1, wherein the cultivation table further comprises:
a conveyor placed at the initial end of the cultivation table and configured to bring elongated troughs of the third plurality of elongated troughs having the growing substrates provided with the sown seeds of the plant to the cultivation table, and
a conveyor placed at the terminal end of the cultivation table and configured to convey elongated troughs of the second plurality of elongated troughs having the growing substrates provided with the grown plants away from the cultivation table.

14. The system according to claim 13, wherein the conveyor placed at the initial end of the cultivation table is configured to convey the elongated troughs of the third plurality of elongated troughs to the cultivation table substantially transversely in relation to a longitudinal direction of the cultivation table, and the conveyor placed at the terminal end of the cultivation table is configured to convey the elongated troughs of the second plurality of elongated troughs away from the cultivation table substantially transversely in relation to a longitudinal direction of the cultivation table.

15. The system according to claim 13, wherein the system further comprises:
automated devices configured to place the growing substrates into the first, second and third plurality of elongated troughs, or alternatively, an automated cutting device configured to cut the growing substrates of the first, second and third plurality of elongated troughs out of sheet elements and to place the growing substrates into the first, second and third plurality of elongated troughs, and
automated devices configured to sow the seeds of the plant into the growing substrates placed in the third plurality of elongated troughs.

16. A method for cultivation of plants in a greenhouse, providing conditions suitable for growing plants, wherein the method comprises:
placing a growing substrate in an elongated trough, wherein the growing substrate is an elongated band-like element provided for cultivation of plants, and thereafter
sowing seeds of the plant into the growing substrate placed in the elongated trough, the growing substrate having the seeds of the plant sown with a selected spacing between the seeds,
introducing the elongated trough holding the growing substrate having the sown seeds of the plant to an initial end of the cultivation table for a germination stage;
germinating the sown seeds of the plant to seedlings of the plant in a germination chamber while keeping the growing substrate and the sown seeds of the plant in the elongated trough, wherein the germination chamber is placed at the initial end of the cultivation table and configured in the germination stage to provide conditions favorable for the germinating, and wherein the germination chamber is connected to the structure of the cultivation table, extends over and covers several elongated troughs,
cultivating the seedlings of the plant while keeping the growing substrate and the seedlings of the plant in the elongated trough,
cultivating grown plants for harvesting while keeping the growing substrate and the grown plants in the elongated trough, and
transferring said elongated trough and several other elongated troughs on a cultivation table, wherein seedlings of the plant with growing substrates placed in a first plurality of elongated troughs are placed on the cultivation table between the initial end of the cultivation table and a terminal end of the cultivation table for providing a growing stage, and wherein grown plants with growing substrates placed in a second plurality of elongated troughs are placed at the terminal end of the cultivation table, wherein the cultivation table is further equipped with devices for supplying irrigation water to elongated troughs, wherein longitudinal directions of said elongated trough and the first and second plurality of elongated troughs are placed parallelly next to each other on the cultivation table and the cultivation table is configured to automatically transfer said elongated trough and the first and second plurality of elongated troughs to a direction transverse to the longitudinal directions towards the terminal end of the cultivation table, the cultivation table being further configured to automatically increase spacing of the plants such that elongated troughs at the initial end of the cultivation table are adjacent to each other and elongated troughs at the terminal end of the cultivation table are spaced from each other.

17. The method according to claim 16, wherein:

the elongated trough holding the growing substrate is totally open at one side.

18. A system for cultivation of plants, comprising: a cultivation table for cultivating plants, a first plurality of elongated troughs having growing substrates provided with seedlings of the plant and placed in the elongated troughs, wherein the first plurality of elongated troughs are placed on the cultivation table between an initial end of the cultivation table and a terminal end of the cultivation table for providing a growing stage, a second plurality of elongated troughs having growing substrates provided with grown plants and placed in the elongated troughs, wherein the second plurality of elongated troughs are placed on the terminal end of the cultivation table, and a third plurality of elongated troughs having growing substrates provided with sown seeds of the plant and placed in the elongated troughs, wherein the third plurality of elongated troughs are placed on the initial end of the cultivation table for providing a germination stage and germinating the sown seeds of the plant to seedlings of the plant, and a germination chamber placed at the initial end of the cultivation table, wherein the germination chamber is configured in the germination stage to provide conditions favorable for the germinating, wherein the germination chamber is connected to the structure of the cultivation table, extends over and covers the third plurality of elongated troughs, wherein the cultivation table is equipped with devices for supplying irrigation water to elongated troughs, wherein each growing substrate of the third plurality of elongated troughs is an elongated band-like element having the seeds of the plant sown with a selected spacing between the seeds, wherein longitudinal directions of the first, second and third plurality of elongated troughs are placed parallelly next to each other on the cultivation table and the cultivation table is configured to automatically transfer the first, second and third plurality of elongated troughs to a direction transverse to the longitudinal directions towards the terminal end of the cultivation table, and wherein at least one of the elongated troughs of the first, second, or third plurality of troughs comprises a plurality of supports that extend along the longitudinal direction of the trough, the plurality of supports protruding upwardly from a bottom of the elongated trough, and a growing substrate is supported on the plurality of supports.

* * * * *